(12) United States Patent
Usui

(10) Patent No.: US 6,543,139 B2
(45) Date of Patent: Apr. 8, 2003

(54) MACHINING TOOL FOR MANUFACTURING RADIAL BEARINGS, AND MANUFACTURING APPARATUS AND MANUFACTURING METHOD USING THE SAME

(75) Inventor: Motonori Usui, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 80 days.

(21) Appl. No.: 09/846,088

(22) Filed: Apr. 30, 2001

(65) Prior Publication Data

US 2002/0020062 A1 Feb. 21, 2002

(30) Foreign Application Priority Data

May 11, 2000 (JP) ......................................... 2000-137967

(51) Int. Cl.[7] ........................... B21D 53/10; B24B 39/02
(52) U.S. Cl. ............................. 29/898.13; 29/898.02; 29/898.04; 29/724; 29/90.01; 72/75
(58) Field of Search .......................... 29/898.02, 898.03, 29/898.04, 898.09, 898.13, 724, 90.01; 72/122, 126, 75, 77, 78, 79, 96, 100

(56) References Cited

U.S. PATENT DOCUMENTS

| | | | |
|---|---|---|---|
| 2,219,784 A | * | 10/1940 | Maupin |
| 3,069,750 A | * | 12/1962 | Koppelmann |
| 3,130,477 A | * | 4/1964 | Gill |
| 3,555,643 A | * | 1/1971 | Koppelmann |
| 5,269,164 A | * | 12/1993 | Choi |
| 5,339,523 A | * | 8/1994 | Hasegawa |
| 5,520,038 A | * | 5/1996 | Clark et al. |
| 5,758,421 A | * | 6/1998 | Asada |
| 5,931,038 A | * | 8/1999 | Higashi |
| 5,946,958 A | * | 9/1999 | Clark et al. |
| 2002/0046451 A1 | * | 4/2002 | Okeda et al. |

FOREIGN PATENT DOCUMENTS

| | | | |
|---|---|---|---|
| JP | 61-006427 | * | 1/1996 |
| JP | 62-193769 | * | 8/1997 |
| JP | 2001-132736 | * | 5/2001 |

* cited by examiner

Primary Examiner—Gregory M. Vidovich
Assistant Examiner—Eric Compton
(74) Attorney, Agent, or Firm—Hogan & Hartson, LLP

(57) ABSTRACT

A machining tool for manufacturing a radial bearing, and a manufacturing apparatus and a manufacturing method using the machining tool are provided. The machining tool includes an inner surface finishing tool to finish an inner circumference surface of a bearing hole provided on a radial bearing. The inner surface finishing tool includes a tool shaft main body member that defines a hollow storage section provided within the tool shaft main body member, a rotatable core piece member mounted inside the hollow storage section in a manner to be rotatable within the tool shaft main body member, and a plurality of roll machining members each with a circular cross-sectional roll machining surface. The plurality of roll machining members rollably abut against the outer circumference surface of the rotatable core piece member. The plurality of roll machining members are in contact under pressure with the inner circumference surface of the bearing hole. The rotatable core piece member is movable in the radial direction and can be tilted with respect to the central axis of the tool shaft main body member.

20 Claims, 8 Drawing Sheets

MACHINING TOOL FOR MANUFACTURING RADIAL BEARINGS, AND MANUFACTURING APPARATUS AND MANUFACTURING METHOD USING THE SAME

BACKGROUND OF THE INVENTION

1) Field of the Invention

The present invention relates to a machining tool for manufacturing radial bearings, which is used to finish the inner circumference surface of a bearing hole in a radial bearing, and a manufacturing apparatus and a manufacturing method using the same. In particular, the present invention is suitable for use on dynamic pressure bearing devices that require high precision.

2) Related Art

Rotation drive devices generally use various types of radial bearing, such as, for example, metal bearings, sintered bearings and dynamic pressure bearings. In the manufacture of such radial bearings, the inner surface of a bearing hole is machined, which is usually done by cutting (lathe machining). For example, first, the diameter of a guide hole is enlarged through a rough machining, and in the subsequent finishing the inner circumference surface of the bearing hole is finished to a predetermined precision with a designed inner diameter dimension, surface roughness and roundness.

However, in the process of finishing the inner surface of a bearing through cutting (lathe machining), sawed marks and wavy marks remain as a result of the machining work. This makes it possible only to finish the inner surface of the bearing at most at a precision level with an inner diameter tolerance of ±2 μm, a surface roughness of about 0.2RA, and a roundness of about 0.5 μm. When trying to achieve a higher precision finishing in particular with a dynamic pressure bearing device, the processing time increases dramatically and an expensive comb tooth-shaped high precision automatic lathe must be used, which considerably reduce productivity. In addition, due to such problems in machining, there are substantial limitations in the bearing characteristics of the various bearing members mentioned above, and it is extremely difficult to obtain high-performance bearing members at low costs.

SUMMARY OF THE INVENTION

It is an object of the present invention to provide a machining tool for manufacturing radial bearings that can finish the inner circumference surface of a high precision bearing at low costs, and a manufacturing device and a manufacturing method using the same.

In accordance with one embodiment of the present invention, a machining tool for manufacturing a radial bearing, and a manufacturing apparatus and a manufacturing method using the machining tool may include an inner surface finishing tool to finish an inner circumference surface of a bearing hole provided on a radial bearing. The inner surface finishing tool may include a tool shaft main body member whose length generally corresponds to the length of the bearing hole in the axial direction. The tool shaft main body member has a hollow storage section. A rotatable core piece member with a circular cross-section is provided inside the hollow storage section in a manner moveable within the tool shaft main body member. A plurality of roll machining members each having a circular roll machining surface are provided about the rotatable core piece member. The plurality of roll machining members rollably abut against the outer circumference surface of the rotatable core piece member. The plurality of roll machining members are brought in contact under pressure with the inner circumference surface of the bearing hole. In one aspect of the present invention, the rotatable core piece member is movable in the radial direction and can be tilted with respect to the central axis of the tool shaft main body member.

As a result, when the finishing tool with roll machining members is inserted into the bearing hole even as the central axes of the finishing tool and the bearing hole are displaced in parallel or have a tilt angle with respect to each other, the plurality of roll machining members would come in contact with the inner circumference surface of the bearing hole as they rotate at a uniform velocity around the rotation core piece member. As a consequence, a uniform pressure is applied to the inner circumference surface of the bearing hole to cause an automatic center-aligning action to take place. Due to the automatic center-aligning action, the rotatable core piece member is forced to move in the radial direction and/or tilt against the central axis of the tool shaft main body member, thereby aligning with the central axis of the tool shaft main body member. As a result, the central axis of the machining diameter that connects the outer most circumference surfaces of the plurality of roll machining members aligns automatically and in high precision with the central axis of the bearing hole; and the machining by the roll machining members begins in a state in which the axes of these members are aligned with high precision. Thereafter, due to the pressing action of the roll machining members, the inner circumference surface of the bearing can be finished in high precision without sawed marks or wavy marks as one would see in cutting.

In accordance with one embodiment of the present invention, a gap δ may be formed in the radial direction between the outer circumference of the rotatable core piece member and the inner circumference surface of the hollow storage section of the tool shaft main body member that would allow free movement of the rotatable core piece member, such that the movement of the rotatable core piece member in the radial direction and/or in the shaft tilt direction can be made easily and reliably using the gap in the radial direction.

Furthermore, in accordance with one embodiment of the present invention, the roll machining surface of each of the roll machining members may have a length L in the axial direction that is the same or longer than a machining diameter D that is defined by a circle connecting the outer most circumference surfaces of roll machining surfaces of the roll machining members. As a result, the roll machining members would abut against the inner circumference surface of the bearing hole in the range of the length L in the axial direction and be able to move in the radial direction or tilt in the axial direction within this abutting range. This causes the uniform velocity rotation of the roll machining members to be conveyed well to the inner circumference surface of the bearing hole and ensures the automatic center-aligning action to take place.

Other features and advantages of the invention will be apparent from the following detailed description, taken in conjunction with the accompanying drawings that illustrate, by way of example, various features of embodiments of the invention.

PREFERRED EMBODIMENTS OF THE INVENTION

One embodiment of the present invention will be explained below. First, an overall structure of a hard disk drive device (HDD) to which the present invention may be applied will be explained with references to the accompanying drawings.

Figure 3:
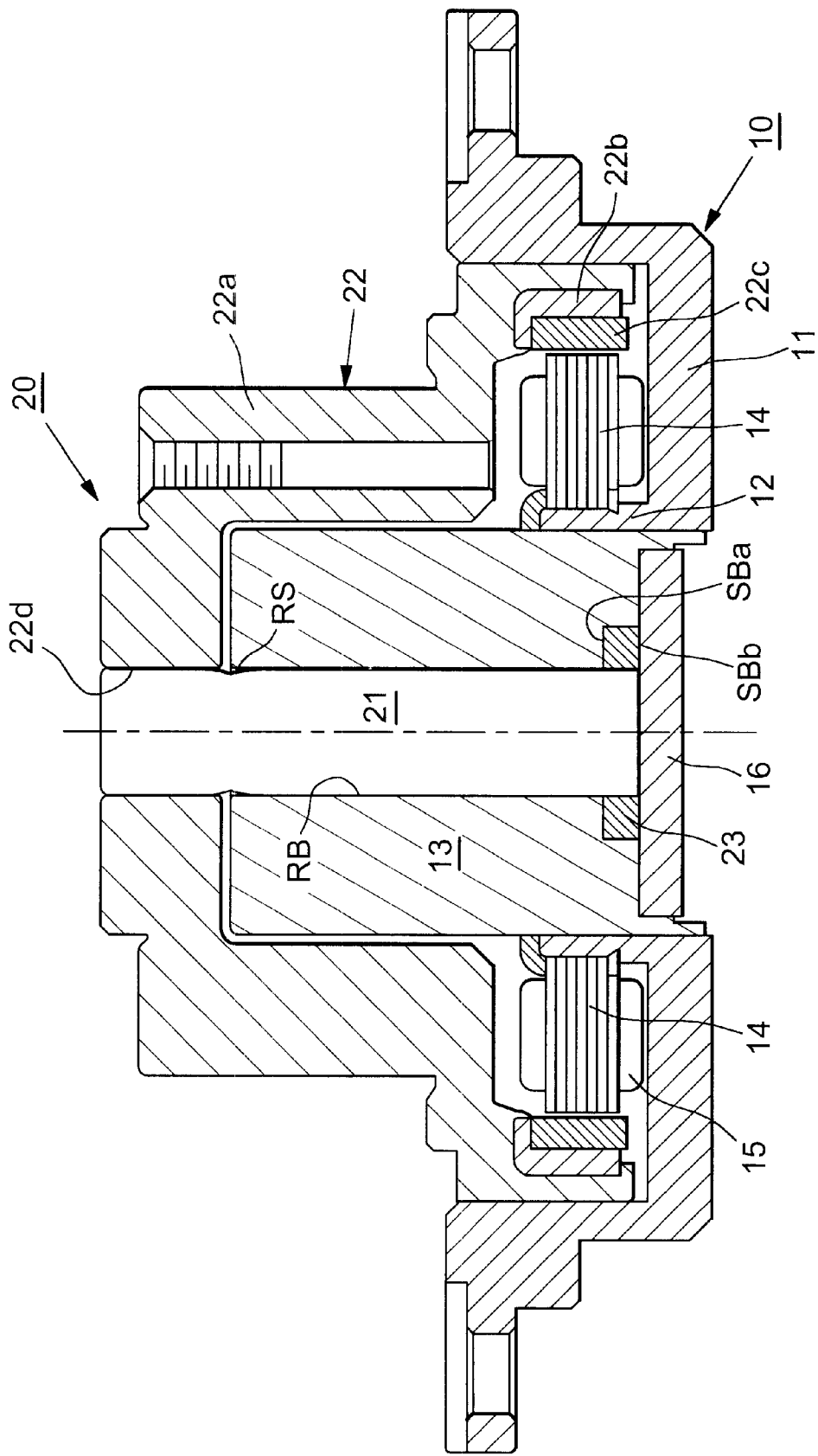
FIG. 3 shows a longitudinal cross-sectional view of an exemplary structure of a motor for a hard disk drive (HDD) apparatus with dynamic pressure bearing members to in accordance with one embodiment of the present invention.

A shaft-rotating spindle motor for an HDD shown in FIG. 3 generally includes a stator assembly 10, which is a fixed member, and a rotator assembly 20, which is a rotating member assembled on top of the stator assembly 10. The stator assembly 10 has a fixed frame 11 screwed onto a fixed base (not shown). The fixed frame 11 is formed from an aluminum metal material to reduce its weight. A ring-shaped bearing holder 12 is formed upright in the generally center area of the fixed frame 11. A bearing sleeve 13 in a hollow cylinder shape, which is a fixed bearing member, is attached to an inner circumference of the bearing holder 12 and joined to the bearing holder 12 through press fit or shrink fit. The bearing sleeve 13 is formed from a copper alloy material, such as phosphorous bronze, in order to facilitate the machining of holes with small diameter.

On the outer circumference mounting surface of the bearing holder 12 is mounted a stator core 14 comprising a stacked layered body of electromagnetic steel plates. A drive coil 15 is wound on each of the salient pole sections provided on the stator core 14.

Figure 4:
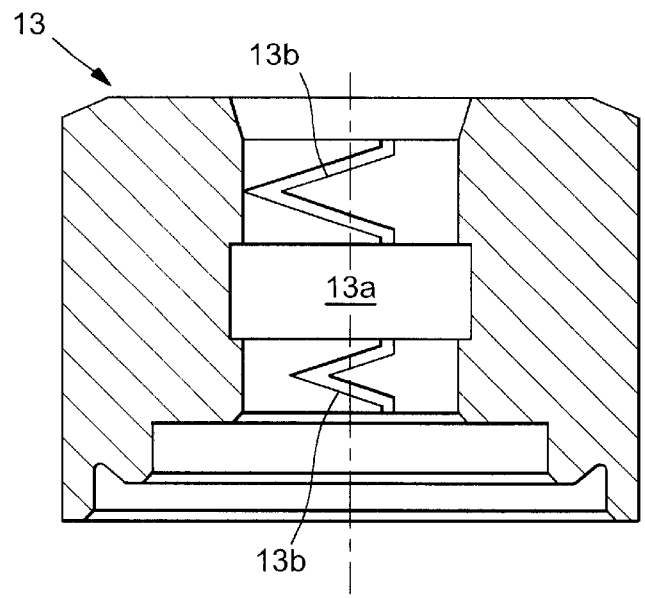
FIG. 4 shows a longitudinal cross-sectional view of the structure of a bearing member used in the HDD apparatus shown FIG. 3.

As shown in FIG. 4, a bearing hole 13a is provided in the center of the bearing sleeve 13, a part of the rotor assembly 20, which is a rotating shaft 21, is inserted inside the bearing hole 13a. The rotating shaft 21 in the present embodiment is formed from stainless steel. This means that the bearing sleeve 13, which is a bearing member, is formed from a material with more resilience than the rotating shaft 21, which is a shaft member.

On the inner circumference surface of the bearing hole 13a of the bearing sleeve 13 is formed a dynamic pressure surface, which is positioned to face in the radial direction a dynamic pressure surface formed on the outer circumference surface of the rotating shaft 21, such that a radial dynamic pressure bearing section RB is created in a minute bearing gap between the dynamic pressure surfaces. More specifically, the dynamic pressure surface on the bearing sleeve 13 side and the dynamic pressure surface on the rotating shaft 21 side in the radial dynamic pressure bearing section RB face each other across a minute gap of a few $\mu$m; this minute gap forms a bearing space into which lubricating fluid is continuously charged in the axial direction.

Radial dynamic pressure generating grooves 13b in a herringbone shape, for example, are provided on at least one of the dynamic pressure surfaces on the bearing sleeve 13 and the rotating shaft 21 in two blocks of concave ring shapes separated in the axial direction. When rotation takes place, the pumping action of the grooves 13b pressurizes the lubricating fluid to generate dynamic pressure, so that the rotating shaft 21 and a rotating hub 22 are shaft-supported in the radial direction.

A capillary sealing section RS is provided at the top end of the bearing space in the figure that forms the radial dynamic pressure bearing section RB. The capillary sealing section RS is structured by an angled surface formed on the rotating shaft 21 or on the bearing sleeve 13 that gradually widens the bearing gap towards the outside of the bearing, and has a gap dimension of about 20 $\mu$m to about 300 $\mu$m, for example. The surface level of the lubricating fluid is positioned within the capillary sealing section RS in both of the motor rotation and stop states.

A rotating hub 22 that along with the rotating shaft 21 forms the rotor assembly 20 is formed from a generally cup-shaped member made of an aluminum metal, so that a recording medium such as a magnetic disk (not shown) can be mounted on the rotating hub 22. In the center area of the rotating hub 22 is provided a joint hole 22d, which is joined in a unitary fashion through press fit or shrink fit with the top area of the rotating shaft 21.

The rotating hub 22 has a generally cylinder-shaped body section 22a on whose outer circumference a disk is mounted, and on the bottom inner circumference wall of the body section 22a is mounted via a back yoke 22b a ring-shaped drive magnet 22c. The magnet 22c is positioned to face the outer circumference end surface of the stator core 14.

At the bottom end of the rotating shaft 21 is fixed a disk-shaped thrust plate 23. The thrust plate 23 is contained in a cylinder-shaped concave recess formed at the bottom center of the bearing sleeve 13. In the recess of the bearing sleeve 13, the dynamic pressure surface provided on the top surface of the thrust plate 23 faces in close proximity the dynamic pressure surface provided on the bearing sleeve 13. A dynamic pressure generating groove is formed on at least one of the two facing dynamic pressure surfaces, and a top thrust dynamic pressure bearing section SBa is formed in the gap between the dynamic pressure surfaces of the thrust plate 23 and the bearing sleeve 13 facing each other.

In close proximity to the bottom dynamic pressure surface of the thrust plate 23 is a counter plate 16, which is formed from a disk-shaped member with a relatively large diameter. The counter plate 16 closes off the bottom opening area of the bearing sleeve 13. A dynamic pressure generating groove is also formed between the dynamic pressure surface provided at the top of the counter plate 16 and the dynamic pressure surface on the bottom of the thrust plate 23, which forms a bottom thrust dynamic pressure bearing section SBb.

The two dynamic pressure surfaces of the thrust plate 23 and the dynamic pressure surface of the bearing sleeve 13 and of the counter plate 16 that faces them together constitute a set of thrust dynamic pressure bearing sections SBa and SBb next to each other in the axial direction and are in each case arranged so that the opposing dynamic pressure surfaces face each other across a minute gap of a few μm; and the lubricating fluid is charge continuously into the minute gaps in the axial direction via a path provided on the outer circumference of the thrust plate 23.

Furthermore, normal herringbone-shaped thrust dynamic pressure generating grooves in a ring shape are provided on at least one of the dynamic pressure surface of the thrust plate 23 and that of the bearing sleeve 13, and on at least one of the dynamic pressure surface of the thrust plate 23 and that of the counter plate 16. As a result, when rotation takes place, the pumping action of the thrust dynamic pressure generating grooves pressurizes the lubricating fluid to generate dynamic pressure and the rotating shaft 21 and the rotating hub 22 are supported in the thrust direction.

Figure 5:
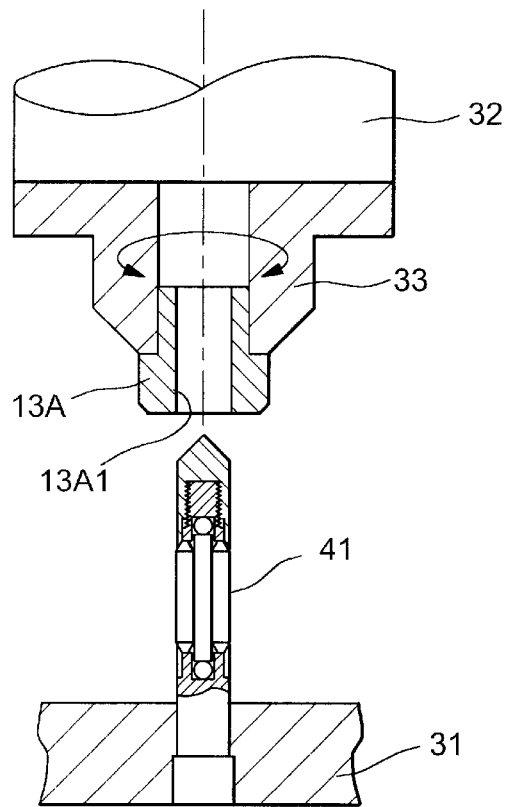
FIG. 5 shows a side view of an embodiment of a manufacturing device using the finishing tool in FIG. 1.
Figure 6:
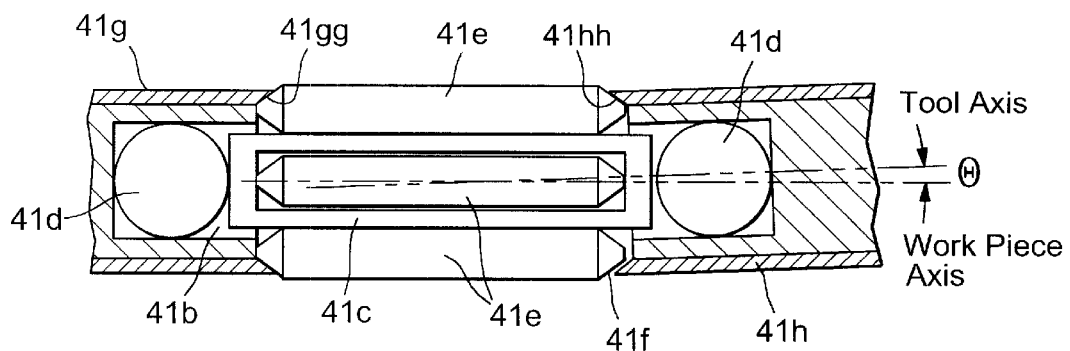
FIG. 6 shows a partially enlarged longitudinal cross-sectional view that is used to describe the automatic center-aligning action of the finishing tool in FIG. 1.

The finishing of the inner circumference surface of the bearing hole 13a of the bearing sleeve 13 used in an HDD spindle motor with a structure described above is performed by a finishing apparatus that uses an inner surface finishing tool 41 shown in FIG. 5 in accordance with one embodiment of the present invention.

The inner surface finishing tool 41 is mounted on a fixed tool stage (tool mounting member) 31 in a manner that the inner surface finishing tool 41 would protrude from the fixed tool stage 31, and a rotating spindle 32 is disposed facing the inner surface finishing tool 41. The rotating spindle 32 is provided with a chuck 33. A bearing material (work piece) 13A for the bearing sleeve 13 is mounted on the chuck 33 with the axis of the bearing sleeve 13 clasped along the axis of the chuck 33. The rotating spindle 32 is structured to move back and forth in the axial direction as it rotates the bearing material (work piece) 13A. By inserting the inner surface finishing tool 41 into the bearing material (work piece) 13A, the inner surface finishing of a bearing hole 13A1 is performed.

In a stage preceding the inner surface finishing of a bearing hole as described above, a cutting (lathe machining) process is performed. The inner surface finishing process follows this cutting process. To summarize the preceding process, first a base hole is made in the bearing material 13A for the bearing sleeve 13, and a first rough machining is performed to enlarge the diameter of the base hole with a cutting tool. Next, in a second rough machining process the same cutting tool is used to machine oil retaining grooves, while further enlarging the diameter of the base hole. The cutting tool is replaced by a ball rolling tool to perform a groove machining process to machine the radial dynamic pressure generating groove 13b, followed by a primary bulged section removal machining process, in which bulged sections that were formed on the bearing hole 13A1 during the machining of the radial dynamic pressure generating groove 13b are removed. However, when the bearing material to be machined is not intended to be made into a dynamic pressure bearing member but merely a slide bearing, there is no need to perform the groove machining process or the bulged section removal machining process.

Next, the inner surface finishing process is performed. In one feature of the present embodiment, the bearing hole 13A1 of the bearing material 13A is machined to have the final finishing precision. The inner surface finishing process is performed using a finishing apparatus equipped with the inner surface finishing tool 41 in accordance with the present invention shown in FIG. 5. The inner surface finishing tool 41 in accordance with one embodiment of the present invention is described below.

Figure 1:
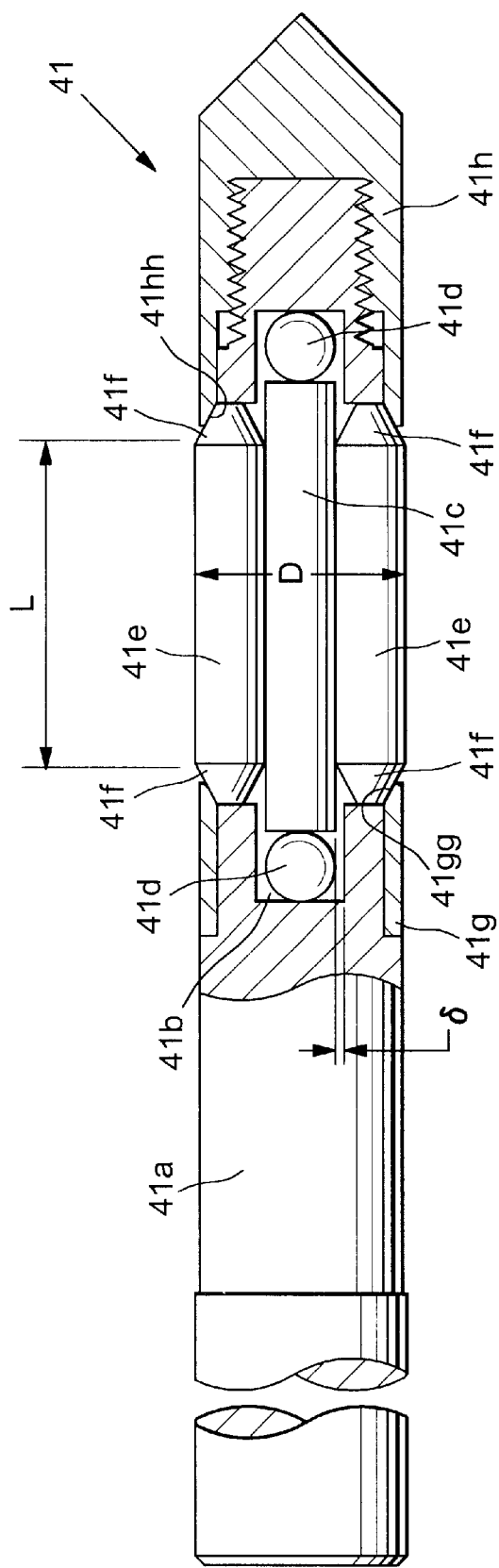
FIG. 1 shows a cross-sectional view in part of a finishing tool in accordance with an embodiment of the present invention.
Figure 2:
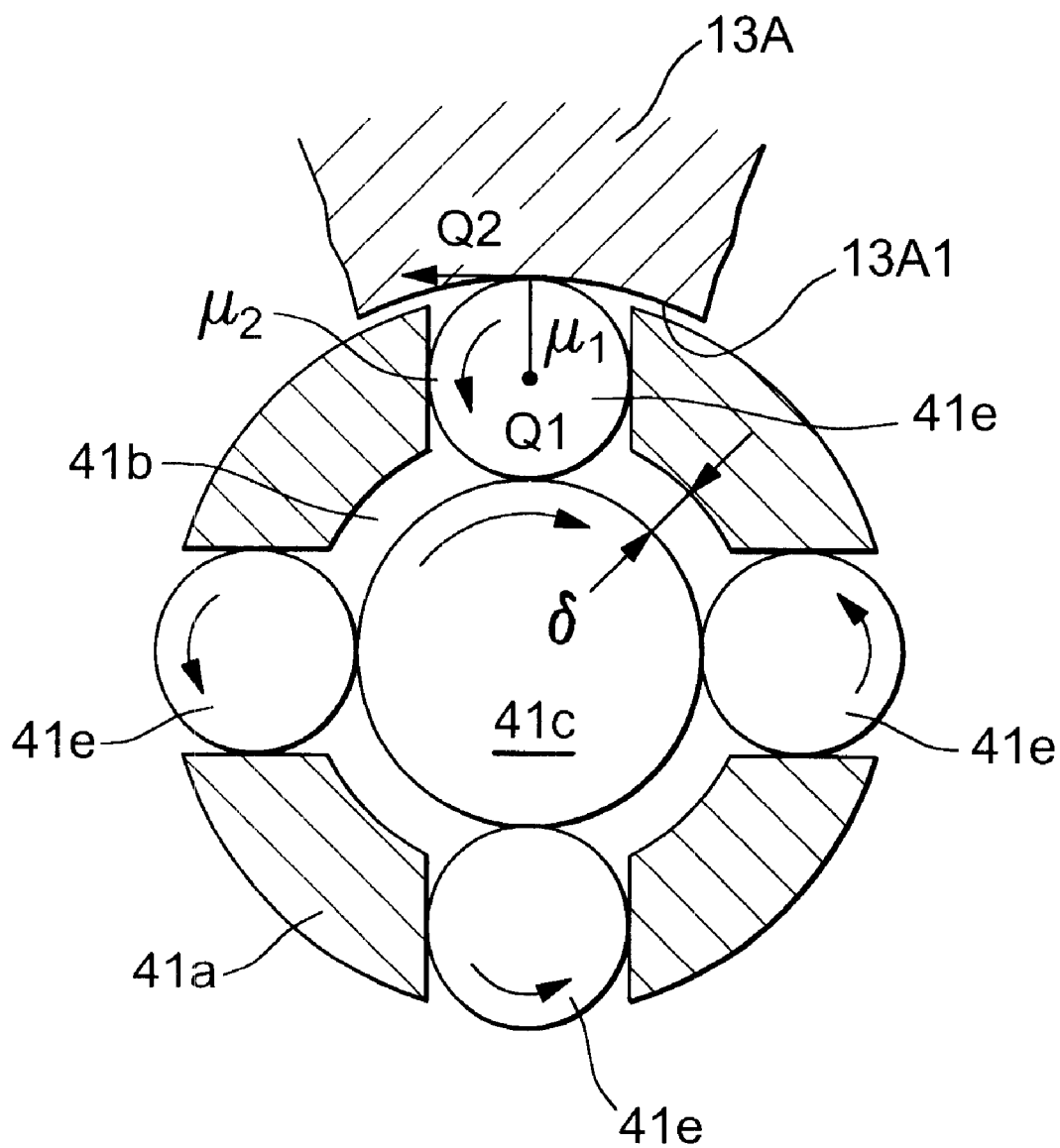
FIG. 2 shows a transverse cross-sectional view of the finishing tool in FIG. 1.

The inner surface finishing tool 41 has a length corresponding to the length of the bearing hole 13A1 in the axial direction, and, as shown in FIGS. 1 and 2, has a relatively thin and long tool shaft main body member 41a that is to be affixed on the tool stage 31 (see FIG. 5). The tool shaft main body member 41a consists of a cylindrical member having a circular cross section that may protrude from the tool stage 31. Inside the tool shaft main body member 41a part way in the axial direction is formed a central storage chamber 41b, which is a hollow cylinder that extends along the axial direction; and within the central storage chamber 41b is rotatably mounted a rotatable core piece member 41c, which has a circular cross-section.

The outer diameter dimension of the rotatable core piece member 41c is set to form a gap δ in the radial direction between the outer circumference surface of the rotatable core piece member 41c and the inner circumference surface of the central storage chamber 41b, so that a floating structure is formed whereby the rotatable core piece member 41c can tilt in the axial direction or freely move in the radial direction within the gap δ in the radial direction.

Furthermore, support spherical members 41d are provided between the two ends in the axial direction of the rotatable core piece member 41c and the respective corresponding two ends in the axial direction of the central storage chamber 41b of the tool shaft main body member 41a. Each end in the axial direction of the rotatable core piece member 41c has a point contact with one of the support spherical members 41d to allow the rotatable core piece member 41c to be supported in the axial direction in a manner freely rotatable around its central axis. In addition to the gap δ in the radial direction, a minute gap is also formed in the axial direction between the rotatable core piece member 41c and each of the support spherical members 41d, such that the minute gaps provided contribute to a structure that allows the rotatable core piece member 41c to tilt as described above.

In the meantime, four roll machining members 41e are rollably abutted against and positioned on the outer circumference surface of the rotatable core piece member 41c.

In one embodiment, the tool shaft main body member 41a has four slots that are provided at generally equal intervals, preferably at angular intervals of 90 degrees. The four slots receive the four roll machining members 41e, respectively. The roll machining members 41e are freely movable in the slots. In one embodiment, each of the slots may have a width that is generally the same as the diameter of each of the roll machining members 41e such that the roll machining members 41e can be moved and tilted within the slots with respect to the central axis of the tool shaft main body member 41a. In one embodiment, opposing two of the roll machining members 41e and the rotatable core piece member 41c, when they are in contact with one another, define a length slightly greater than the diameter of the outer periphery of the tool shaft main body member 41a. As a result, at least a part of one of the opposing two roll machining members 41e protrudes from the outer periphery of the tool shaft main body member 41a and comes in contact with the inner circumference surface of the bearing hole 13A1.

The outer circumference surface of each of the roll machining members 41e defines a roll machining surface with a circular cross-section that may be brought in contact under pressure with the inner circumference surface of the bearing hole 13A1. When the rotatable core piece member 41c is rotatably driven, the roll machining surface on each of the roll machining members 41e rolls as it may come in contact under pressure with the inner circumference surface of the bearing hole 13A1, while the four roll machining members 41e abutting on the rotatable core piece member 41c rotate at a uniform velocity to each other. A force generated by the pressing action of the roll machining surface on each of the roll machining member 41e (i.e., a force $Q2 \cdot \mu 2$ in FIG. 2) created in this state performs the finishing of the inner circumference surface of the bearing hole 13A1.

The force $Q2 \cdot \mu 2$ generated by the pressing action caused by the shearing force Q2 of the roll machining surface on each of the roll machining members 41e is set to be significantly smaller than a force Q1 generated by the pressing action in the radial direction of the roll machining member 41e ($Q2 \cdot \mu 2 << Q1$). This ensures that the floating structure referred to above will be obtained.

In the meanwhile, both ends in the axial direction of each of the roll machining members 41e are formed by cone-shaped angled surface sections 41f, and a pair of retaining rings 41g and 41h cover the outer exposed parts of the angled surface sections 41f The retaining rings 41g and 41h are detachably mounted on the tool shaft main body member 41a. In other words, the pair of retaining rings 41g and 41h holds the angled surface section 41f on each of the roll machining members 41e from the outside with their angled surfaces 41gg and 41hh, and thereby functions to prevent each of the roll machining members 41e from slipping off the tool shaft main body member 41a. As a result, by removing the retaining rings 41g and 41h from the tool shaft main body member 41a, the roll machining members 41e can be replaced and/or detached. In one embodiment, the retaining ring 41h is screw-fastened to the tip of the tool shaft main body member 41a. Therefore, the retaining ring 41h can be unscrewed and removed from the tool shaft main body member 41a; and by removing the retaining ring 41h, the roll machining members 41e can also be removed and/or replaced.

Of the pair of retaining rings 41g and 41h, the retaining ring 41h positioned at the tool tip side is formed to have a pointed shape at its tip (right end of FIG. 1), so that it can be readily inserted into the bearing hole 13A1.

It is noted that a length L in the axial direction of the roll machining surface on each of the roll machining members 41e is designed to be the same or longer than a machining diameter D that is defined by a circle connecting the outer most circumference surfaces of the roll machining surfaces on the four roll machining members 41e. By setting the length L in the axial direction of the roll machining surface at such a length, the roll machining members 41e can abut against the inner circumference surface of the bearing hole 13A1 in the range of the length L in the axial direction and move in the radial direction or tilt in the axial direction within this abutting range. Consequently, the uniform velocity rotation of the roll machining members 41e is conveyed effectively to the inner circumference surface of the bearing hole 13A1 and the automatic center-aligning action is reliably obtained.

In performing an inner surface finishing process of the base hole 13A1 of the bearing material 13A using the inner surface finishing tool 41 according to the embodiment having a structure described above, the inner surface finishing tool 41 is inserted into the base hole 13A1 of the bearing material 13A. When the inner surface finishing tool 41 is inserted into the base hole 13A1, and even when, for example, the central axis of the tool 41 and that of the base hole 13A1 of the bearing material 13A are displaced parallel to each other or tilted with respect to each other, the automatic center-aligning action described below would readily and reliably position the central axis defined by the four roll machining members 41e of the inner surface finishing tool 41 to the central axis of the bottom hole 13A1 of the bearing material 13A.

That is to say, when the inner surface finishing tool 41 is rotatably driven, the four roll machining members 41e come in contact with the inner circumference surface of the base hole 13A1 of the bearing material 13A as the four roll machining members 41e rotate in a uniform velocity around the rotatable core piece member 41c. When this happens, an automatic center-aligning action takes place as a result of the uniform velocity rotation and uniform pressure against the inner circumference surface of the bottom hole 13A1. As shown in FIG. 1, the outer diameter dimension of the rotatable core piece member 41c is set to form the gap δ in the radial direction between the outer circumference surface of the rotatable core piece member 41c and the inner circumference surface of the central storage chamber 41b. As a result, the rotatable core piece member 41c can tilt with respect the axial direction or freely move in the radial direction within the gap δ in the radial direction. In addition to the gap δ in the radial direction, a minute gap is also formed in the axial direction between the rotatable core piece member 41c and each of the support spherical members 41d, and the minute gaps provided contribute to a structure that allows the rotatable core piece member 41c to tilt as described above. Consequently, minute movements of the rotatable core piece member 41c including shifts in the radial direction and tilt movements with respect to the axial direction take place. In other words, the automatic center-aligning action resulting from the structure described above takes place, and this causes the central axis of the rotatable core piece member 41c to be forcibly moved in the radial direction and/or tilted against the tool shaft main body member 41a to align with the central axis of the base hole 13A1 of the bearing material 13A. As a result, the central axis of the machining diameter D that is defined by a circle connecting the outer most circumference surfaces of the roll machining surfaces on the four roll machining members 41e aligns automatically and in high precision with the central axis of the base hole 13A1 of the bearing material 13A. The finishing by the roll machining members 41e begins in the state of high precision alignment of the axial lines; thereafter, the inner circumference surface of the bearing is finished in high precision due to the pressure application action by the roll machining members 41e, without sawed marks or wavy marks that may appear in a cutting work.

Figure 7:
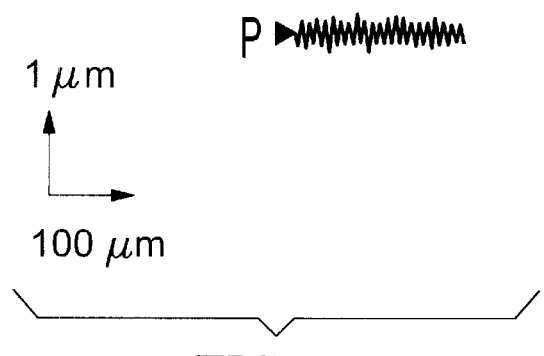
FIG. 7 shows an enlarged surface view of the surface condition before being finished by the finishing tool in FIG. 1.
Figure 8:
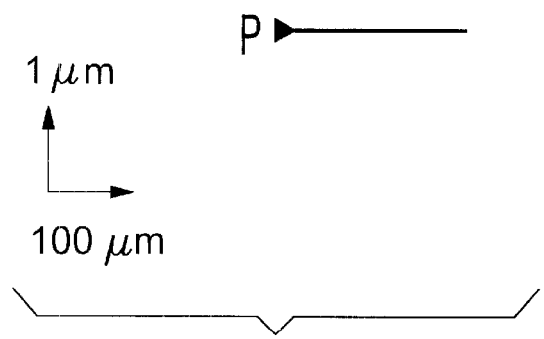
FIG. 8 shows an enlarged surface view of the surface condition after being finished by the finishing tool in FIG. 1.

For example, it has been confirmed that a surface that is uneven in a cutting process as shown in FIG. 7 becomes to have an extremely smooth mirror-like condition after a finishing process is conducted using the inner surface finishing tool 41 according to the present invention.

Figure 9:
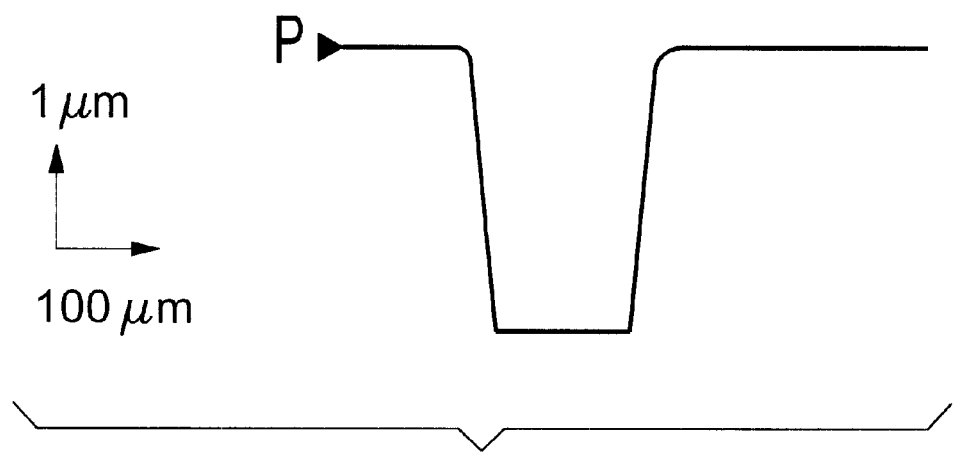
FIG. 9 shows a partially enlarged cross-sectional view of a dynamic pressure surface after being finished by the finishing tool in FIG. 1.
Figure 10:
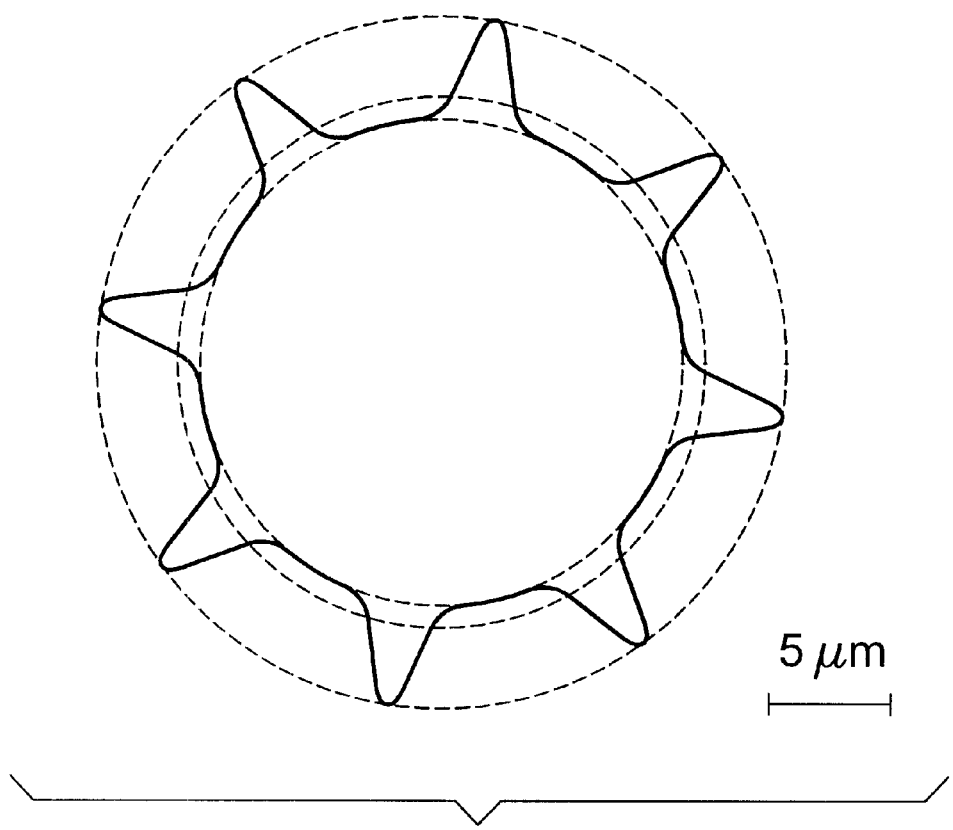
FIG. 10 shows a cross-sectional view of a dynamic pressure surface after being finished by the finishing tool in FIG. 1.

The inner surface finishing tool 41 with roll machining as described above can be used for the bearing member 13 for a dynamic pressure bearing device which requires a high precision finish of the bearing inner surface as in the embodiment. As a result, the bearing member 13 can have a bearing inner circumference surface with a high precision diameter tolerance, a surface roughness and a roundness, as shown in FIGS. 9 and 10, and therefore favorable bearing characteristics can be readily obtained.

When the inner surface finishing process is performed on the bearing member 13 used in a dynamic pressure bearing apparatus described above through a roll machining in accordance with the embodiment described above, a bulged section removal machining process that may be normally performed after the groove machining can be omitted. In other words, even if the bulged section removal machining process is skipped to immediately perform the inner surface finishing process according to the present invention after the machining of the radial dynamic pressure generating grooves 13b, the inner circumference surface of the base hole 13A1 of the bearing material 13A can be finished equally with a high precision.

In the embodiment, the rotatable core piece member 41c is readily and securely allowed to move in a radial direction and/or tilt in a tilted axial direction due to the gap δ formed between the rotatable core piece member 41c and the central storage section 41b of the tool shaft main body member 41a. Similarly, the movement of the rotatable core piece member 41c in a radial direction and/or in a tilted axial direction is readily and securely made by setting the length L in the axial direction of the roll machining surfaces of the roll machining members 41e as long as possible, as in the case of the embodiment described above. Also, similarly, the movements of the rotatable core piece member 41c in a radial direction and/or in a tilted axial direction is readily and securely made via the support spherical members 41d that support the rotatable core piece member 41c in the axial direction thereof, as in the case of the embodiment described above.

Furthermore, in the embodiment described above, due to the fact that the roll machining members 41e are replaceable, the machining diameter determined by the roll machining members 41e can be easily changed and the unit can be used consistently over a long period of time.

Figure 11:
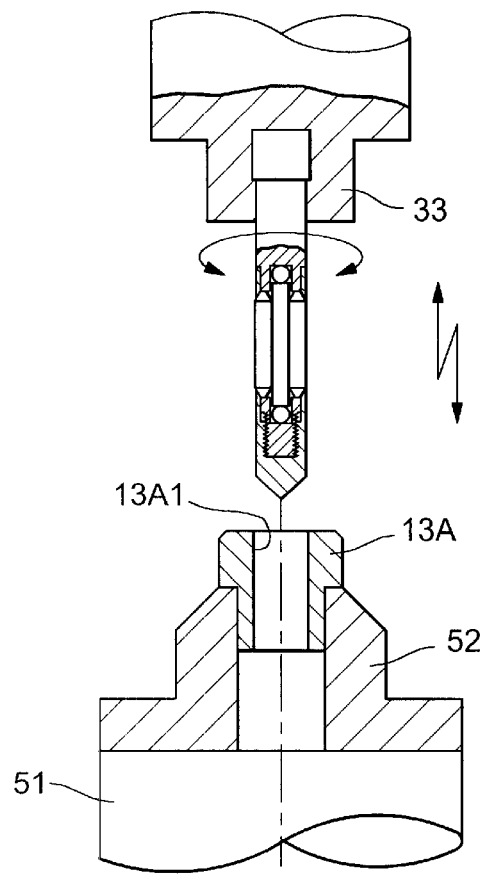
FIG. 11 shows a side view of another embodiment of a manufacturing device using the finishing tool in FIG. 1.

An inner surface finishing process using the inner surface finishing tool 41 in accordance with the present invention can be performed by reversing the fixed elements and the rotating elements in the embodiment. In other words, as shown in FIG. 11, a similar inner surface finishing process can be performed by a finishing manufacturing device in which an inner surface finishing tool 41 is mounted on a chuck 33 on the rotating spindle side, while a bearing material (work piece) 13A is fixed on a chuck 52 on a work stage (work mounting member) 51 that is fixed in place.

Figure 12:
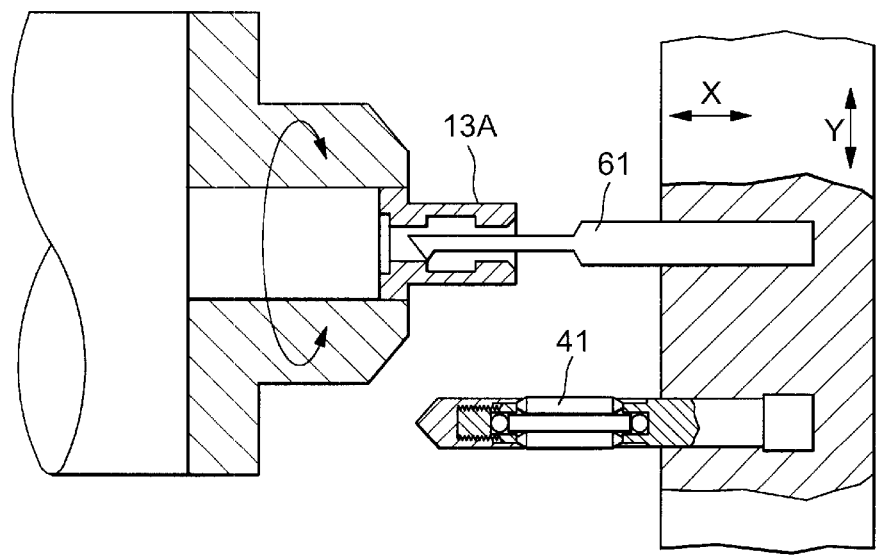
FIG. 12 shows a side view of yet another embodiment of a manufacturing device using the finishing tool in FIG. 1.
Figure 13:
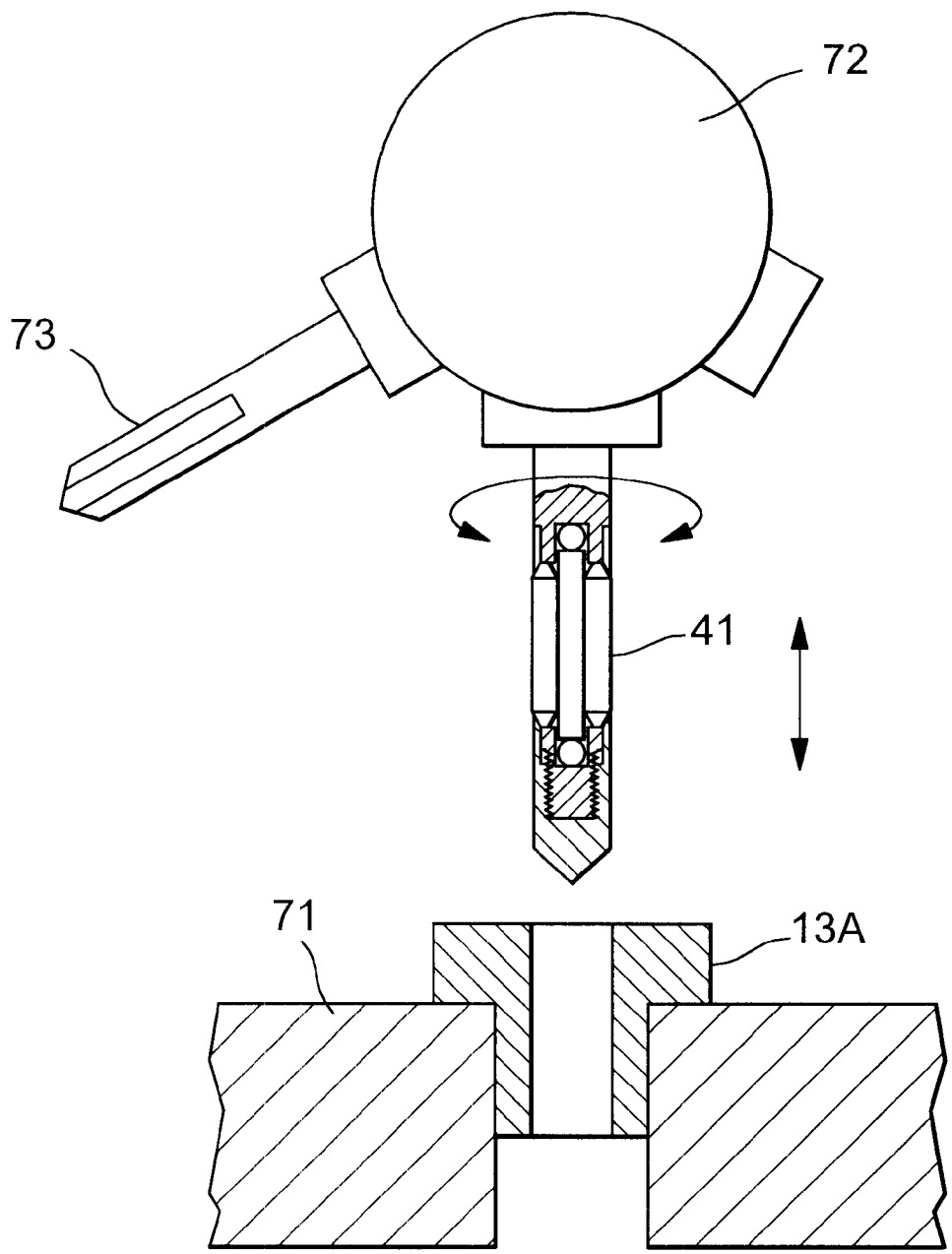
FIG. 13 shows a side view of still another embodiment of a manufacturing device using the finishing tool in FIG. 1.

Moreover, an inner surface finishing process using the inner surface finishing tool 41 in accordance with the present invention can be performed using the same device used to perform the cutting (lathe machining) that precedes the inner surface finishing. For example, in a comb tooth-shaped precision lathe shown in FIG. 12, a normal cutting tool 61 and the inner surface finishing tool 41 in accordance with the present invention may be both retained by a chuck. Also, using an equipment such as a tapping machine shown in FIG. 13, a bearing material (work piece) 13A may be attached on a table 71 while attaching a normal cutting tool 73 and the inner surface finishing tool 41 in accordance with the present invention to a rotating head 72 in a manner that both of the tools can be switched from one to the other by rotating the rotating head 72. As a result, the automatic center-aligning action of the inner surface finishing tool 41 described above would likewise yield a high precision finishing.

The embodiments of the invention are described above. However, needless to say, the present invention is not limited to the embodiments described above, and many modifications can be made without departing from the subject matter of the present invention.

For instance, the present invention can be similarly applied to dynamic pressure bearing apparatuses that are used on motors other than the hard disk drive (HDD) motors, such as motors for rotating polygon mirrors.

Furthermore, the present invention is not limited in its application to dynamic pressure bearings and can be similarly applied to finish other ordinary bearing members such as slide bearings.

With a machining tool for manufacturing a radial bearing in accordance with the present invention as described above, and a manufacturing device and a manufacturing method using the same, when a finishing tool with roll machining members is inserted into a bearing hole of the radial bearing even when the central axes of the two members are displaced in parallel or have a tilt angle with respect to each other, a plurality of roll machining members would come in contact with the inner circumference surface of the bearing hole as they rotate at a uniform velocity, which causes an automatic center-aligning action to take place. The automatic center-aligning action causes the central axis of the machining diameter defined by the plurality of roll machining members to align automatically and in high precision with the central axis in the center of the bearing hole; and the machining by the pressure application action of the roll machining members takes place in a state of high precision alignment of the axial lines. Consequently, the inner circumference surface of the bearing can be finished in high precision without sawed marks or wavy marks as one would see in cutting.

By forming a gap δ between a rotatable core piece member and a storage section of a tool shaft main body member to allow the rotatable core piece member to move freely in a radial direction and/or tilt against an axial direction, the automatic center-aligning action of the roll machining members can securely take place.

Furthermore, by making a length L in the axial direction of the roll machining surface of the roll machining members to be relatively long, a stable automatic center-aligning action of the roll machining members can take place.

In addition, by providing support in the axial direction of the rotatable core piece member via support spherical members, the rotatable core piece member will be more readily, freely movable in a radial direction and in a tilted axial direction, which would make the automatic center-aligning action of the roll machining members to take place even more readily and reliably.

Moreover, by making the roll machining members replaceable, the machining diameter can be easily changed and the unit can be used over a long period of time.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A radial bearing machining tool comprising:
   a tool shaft main body member defining a hollow storage section;
   a rotatable core piece member having a circular cross-section and provided inside the hollow storage section of the tool shaft main body; and
   a plurality of rollable machining members disposed about the rotatable core piece member, each of the roll machining members having a circular cross-sectional roll machining surface in contact with an outer circumference surface of the rotatable core piece member,
   where the rotatable core piece member is movable at least in a radial direction and in an axially tilted direction with respect to a central axis of the tool shaft main body member.

2. A radial bearing machining tool according to claim 1, wherein a gap δ is provided in the radial direction between an outer circumference surface of the rotatable core piece member and an inner circumference surface of the hollow storage section of the tool shaft main body member, to thereby allow free movements of the rotatable core piece member.

3. A radial bearing machining tool according to claim 1, wherein the roll machining surface of each of the roll machining members has a length L in an axial direction that is generally identical or greater than a machining diameter D defined by a circle connecting outer most circumference surfaces of the roll machining surfaces of the roll machining members.

4. A radial bearing machining tool according to claim 1, further comprising support spherical bodies that support both ends of the rotatable core piece member in the axial direction against both ends in the axial direction of the hollow storage section of the tool shaft main body member.

5. A radial bearing machining tool according to claim 1, wherein the roll machining members are removably mounted on the tool shaft main body member.

6. A radial bearing machining tool according to claim 1, wherein the roll machining members are moveably retained onto the tool shaft main body member by at least one retaining member screw-fastened to the tool shaft main body member.

7. A radial bearing machining tool according to claim 6, wherein each of the roll machining members has a generally conical-shaped end portion with an inclined surface that is supported by the at least one retaining member.

8. A radial bearing machining tool according to claim 1, wherein the roll machining members are moveable in a radial direction with respect to the tool shaft main body member and tiltable with respect to a central axis of the tool shaft main body member.

9. A radial bearing machining tool according to claim 1, wherein the tool shaft main body member has slots in a corresponding number of the roll machining members, and the roll machining members are received and moveable in the slots in radial directions with respect to the tool shaft main body member and tiltable with respect to a central axis of the tool shaft main body member.

10. A radial bearing manufacturing apparatus with a bearing hole inner surface finishing tool, the inner surface finishing tool comprising:
    a tool shaft main body member defining a hollow storage section;
    a rotatable core piece member having a circular cross-section and provided inside the hollow storage section of the tool shaft main body; and
    a plurality of rollable machining members disposed about the rotatable core piece member, each of the roll machining members having a circular cross-sectional roll machining surface in contact with an outer circumference surface of the rotatable core piece member,
    where the rotatable core piece member is movable at least in a radial direction and in an axially tilted direction with respect to a central axis of the tool shaft main body member.

11. A radial bearing manufacturing apparatus according to claim 10, wherein a gap δ is provided in the radial direction between an outer circumference surface of the rotatable core piece member and an inner circumference surface of the hollow storage section of the tool shaft main body member, to thereby allow free movements of the rotatable core piece member.

12. A radial bearing manufacturing apparatus according to claim 10, wherein the roll machining surface of each of the roll machining members has a length L in an axial direction that is generally identical or greater than a machining diameter D defined by a circle connecting outer most circumference surfaces of the roll machining surfaces of the roll machining members.

13. A radial bearing manufacturing apparatus according to claim 10, further comprising support spherical bodies that support both ends of the rotatable core piece member in the axial direction against both ends in the axial direction of the hollow storage section of the tool shaft main body member.

14. A radial bearing manufacturing apparatus according to claim 10, wherein the roll machining members are removably mounted on the tool shaft main body member.

15. A radial bearing manufacturing apparatus according to claim 10, wherein the roll machining members are moveably retained onto the tool shaft main body member by at least one retaining member screw-fastened to the tool shaft main body member.

16. A radial bearing manufacturing apparatus according to claim 10, wherein the roll machining members are moveable in a radial direction with respect to the tool shaft main body member and tiltable with respect to a central axis of the tool shaft main body member.

17. A radial bearing manufacturing apparatus according to claim 10, wherein the tool shaft main body member has slots in a corresponding number of the roll machining members, and the roll machining members are received and moveable in the slots in radial directions with respect to the tool shaft main body member and tiltable with respect to a central axis of the tool shaft main body member.

18. A radial bearing manufacturing method using a radial bearing finishing tool, the radial bearing finishing tool comprising: a tool shaft main body member defining a hollow storage section; a rotatable core piece member provided inside the hollow storage section of the tool shaft main body; and a plurality of rollable machining members disposed about the rotatable core piece member, each of the roll machining members having a circular cross-sectional roll machining surface in contact with an outer circumference surface of the rotatable core piece member, the method comprising the steps of:
    providing the rotatable core piece member in the hollow storage section of the tool shaft main body member in a manner freely movable in a radial direction and in a tilted axial direction against a central axis of the tool shaft main body member;
    inserting the radial bearing finishing tool into a bearing hole to be formed in a bearing member;
    providing a rotational movement to the rotatable core piece member to thereby rotate each of the plurality of roll machining members at a uniform velocity to cause movements to the rotatable core piece member in the radial direction and in tilted axial directions against the central axis of the tool shaft main body member; and centering the plurality of roll machining members by the movements of the rotatable core piece member about the central axis of the bearing hole to finish an inner circumference surface of the bearing hole.

19. A radial bearing manufacturing method according to claim 18, further comprising providing a gap δ in the radial direction between an outer circumference surface of the rotatable core piece member and an inner circumference surface of the hollow storage section of the tool shaft main body member, to thereby allow free movements of the rotatable core piece member.

20. A radial bearing manufacturing method according to claim 18, wherein the roll machining surface of each of the roll machining members is set to have a length L in an axial direction that is generally identical or greater than a machining diameter D defined by a circle connecting outer most circumference surfaces of the roll machining surfaces of the roll machining members.

* * * * *